US008615769B2

(12) United States Patent
Nishihata

(10) Patent No.: US 8,615,769 B2
(45) Date of Patent: Dec. 24, 2013

(54) DATA PROCESSING SYSTEM, DATA PROCESSING METHOD, AND DATA PROCESSING PROGRAM

(75) Inventor: Yoshihiko Nishihata, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 13/022,965

(22) Filed: Feb. 8, 2011

(65) Prior Publication Data

US 2011/0214130 A1 Sep. 1, 2011

(51) Int. Cl.
*G06F 9/46* (2006.01)
(52) U.S. Cl.
USPC ......................................................... 718/106
(58) Field of Classification Search
None
See application file for complete search history.

(56) References Cited

U.S. PATENT DOCUMENTS

| | | | | |
|---|---|---|---|---|
| 6,393,537 | B1 * | 5/2002 | Kern et al. | 711/162 |
| 6,457,021 | B1 * | 9/2002 | Berkowitz et al. | 1/1 |
| 7,065,623 | B2 * | 6/2006 | Chen et al. | 711/169 |
| 7,650,602 | B2 * | 1/2010 | Amamiya et al. | 718/104 |
| 2003/0217119 | A1 * | 11/2003 | Raman et al. | 709/219 |
| 2008/0022060 | A1 * | 1/2008 | Sakai et al. | 711/162 |
| 2008/0163175 | A1 * | 7/2008 | Krauss | 717/127 |
| 2008/0229314 | A1 * | 9/2008 | Hirose et al. | 718/102 |

FOREIGN PATENT DOCUMENTS

JP 4140014 B 8/2008

* cited by examiner

*Primary Examiner* — Emerson Puente
*Assistant Examiner* — Sisley Kim

(57) ABSTRACT

The present invention provides a system which executes processes in steps so as to increase the speed of processing and implement links with other systems easily. The data processing system includes: an AP execution unit which executes operational processing while referring to/updating an in-memory DB and a disk type DB; a buffer storage unit which stores output data of the operational processing in a data buffer; a response transmission unit which issues a processing end notice of the operational processing; a temporary file storage unit which stores, in a temporary file, the output data stored in the data buffer; a request transmission unit which transmits a commitment request with respect to the disk type DB; a disk type DB commitment unit which commits the disk type DB by updating a control table; a normal file storage unit which changes the temporary file to a normal file, and an in-memory DB commitment unit which commits the in-memory DB.

2 Claims, 10 Drawing Sheets

Fig. 3

| CONTROL FILE | |
|---|---|
| PROCESSING PROGRESS STATE | ... |
| 001 | ⋮ |

Fig. 4

| BUFFER MANAGEMENT TABLE | | | |
|---|---|---|---|
| BUFFER ID | BUFFER SIZE | UPDATE FLAG | ACTIVE FLAG |
| Bu01 | 99999 | ON | ON |
| Bu02 | 99999 | OFF | OFF |
| ⋮ | ⋮ | ⋮ | ⋮ |

Fig. 5

| BUFFER TABLE | | | | |
|---|---|---|---|---|
| BUFFER ID | BLOCK ID | AP IDENTIFIER | EFFECTIVE FLAG | DATA AREA |
| Bu01 | BI01 | AP01 | ON | XXXXXXX |
| Bu01 | BI02 | AP02 | OFF | XXXXXXX |
| ⋮ | ⋮ | ⋮ | ⋮ | ⋮ |

Fig. 6

| CONTROL TABLE | |
|---|---|
| AP IDENTIFIER | PROCESSING PROGRESS STATE |
| AP01 | 001 |
| AP02 | 000 |
| ⋮ | ⋮ |

DATA PROCESSING SYSTEM, DATA PROCESSING METHOD, AND DATA PROCESSING PROGRAM

This application is based upon and claims the benefit of priority from Japanese patent application No. 2010-41706, filed on Feb. 26, 2010, the disclosure of which is incorporated herein in its entirety by reference.

BACKGROUND

The present invention relates to a data processing system, a data processing method and a data processing program.

Some systems, which perform such data processing as operational processing, divide the processing in the system into a plurality of processes, and accomplish processing assigned to the system by executing each process in steps. In such a system, not only executing the processing allocated to each process, but also the data which is output as the processing result is provided to the subsequent process. In the subsequent process, the processing is executed while referring to the data provided by the previous process. Japanese Patent No. 4140014 discloses a system which divides the processing in the system into a plurality of services (processes), executing the processing in steps for each service.

A system, which performs such data processing as operational processing, requires high-speed processing, and therefore must execute the processing in each process at high-speed. Furthermore operations are now diversified, so data links among a plurality of systems are also demanded so that the data processed in one system can be referred to by another system, for example.

SUMMARY

An exemplary object of the invention is to provide a data processing system, data processing method and data processing program in a system which executes processes in steps, so as to increase the speed of processing and implement links with other systems easily.

The data processing system according to an exemplary aspect of the present invention includes: an execution unit which executes a plurality of applications in one process while referring to/updating a first database for storing data in a main storage device and a second database for storing data in an auxiliary storage device; a buffer storage unit which stores output data by the application executed by the execution unit in a buffer separately for each of the applications; an issuing unit which issues a processing end notice every time processing by the application ends; a first storage unit which stores, out of the output data stored in the buffer, the output data corresponding to the application for which the processing end notice is issued, in a first file which cannot be referred to from another process; a commitment request unit which requests the application for which the processing end notice is issued to commit the second database; a first commitment unit which updates a processing progress state stored in the second database separately for each of the applications, and commits the second database when commitment is requested; a second storage unit which stores the output data stored in the first file, in a second file which can be referred to from another process, when the commitment by the first commitment unit is completed for all the applications; and a second commitment unit which commits the first database when the output data in the first file is stored in the second file.

A data processing method according to an exemplary aspect of the present invention includes: an execution step of executing a plurality of applications in one process while referring to/updating a first database for storing data in a main storage device and a second database for storing data in an auxiliary storage device; a buffer storage step of storing output data by the application executed in the execution step in a buffer separately for each of the applications; an issuing step of issuing a processing end notice every time processing by the application ends; a first storage step of storing, out of the output data stored in the buffer, the output data corresponding to the application for which the processing end notice is issued, in a first file which cannot be referred to from another process; a commitment request step of requesting the application for which the processing end notice is issued to commit the second database; a first commitment step of updating a processing progress state stored in the second database separately for each of the applications, and committing the second database when the commitment is requested; a second storage step of storing the output data stored in the first file in a second file which can be referred to from another process, when the commitment in the first commitment step is completed for all the applications; and a second commitment step of committing the first database when the output data in the first file is stored in the second file.

A data processing program according to an exemplary aspect of the present invention causes a computer to execute each step included in the data processing method.

DESCRIPTION OF THE DRAWINGS

FIG. 3 shows an example of a data configuration of a data buffer management table;

FIG. 4 shows an example of a data configuration of a data buffer table;

FIG. 5 shows an example of a data configuration of a control file;

FIG. 6 shows an example of a data configuration of a control table;

EXEMPLARY EMBODIMENT

Preferred embodiments of a data processing system, data processing method and data processing program will now be described with reference to the accompanying drawings.

First Embodiment

Figure 1:
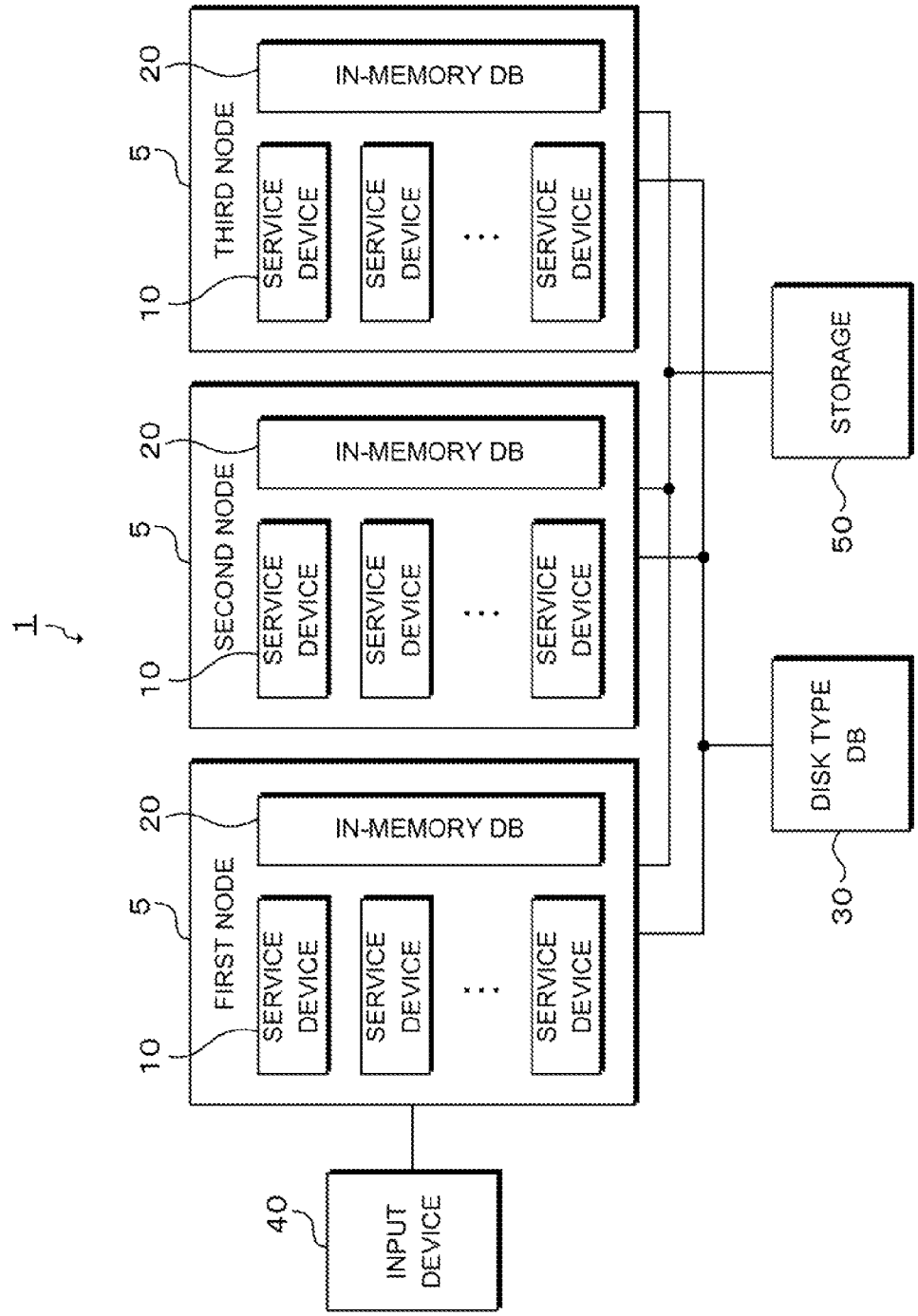
FIG. 1 is a block diagram depicting an example of a general configuration of a data processing system according to an embodiment.

A general configuration of the data processing system according to a first embodiment will be described first with reference to FIG. 1. As FIG. 1 shows, the data processing system 1 has: three nodes 5 each of which includes a plurality of server device 10 and an in-memory DB (Database) 20; a disk type DB 30, an input device 40 and a storage 50. The in-memory DB 20 is a database which stores all the data in a main storage device (e.g. semiconductor memory such as RAM (Random Access Memory)), and operates while holding all the data in the main storage device. The disk type DB 30 is a database which stores all the data in an auxiliary storage device (e.g. HDD (Hard Disk Drive), storage), and operates while holding the data in the auxiliary storage device. An RDB (Relational Database), for example, is an example of the disk type DB.

The data processing system 1 according to this embodiment is a system in which processing in the system is divided into three processes, and each process is executed in steps. Each process is executed by one of the server devices 10 in the node 5 disposed corresponding to the process. A number of processes and that of the nodes are not limited to three. The processing can be divided into an optimal number of processes according to the processing content of the system. A same number of nodes as the number of divided processes can be disposed.

An example of data processing in the data processing system 1 will be described. An operational processing is an example of data processing. Herein below is a case when data processing, as an operational processing, will be described. For example, firstly, one of the server devices 10 belonging to the first node 5 executes an operational processing corresponding to a first process using input data 41 which is input from the input device 40, and stores the output data of this operational processing in a data file 52 of the storage 50. The server device 10 belonging to the first node 5 notifies the information on the first data file 52 to one of the server devices 10 belonging to the second node 5. The server device 10 belonging to the second node 5, which received the notice, executes an operational processing corresponding to a second process using the data stored in the first data file 52, and stores the output data of this operational processing in a second data file 52 of the storage 50. Hereafter in the same manner, a server device 10 belonging to the third node 5 executes an operational processing corresponding to a third process using the data stored in the second data file 52, and stores the output data of this operational processing in a third data file 52 of the storage 50.

The functional configuration of the server device 10 according to the first embodiment will now be described with reference to FIG. 2. The functional configuration of the server device 10 shown in FIG. 2 is common for all the server devices 10 shown in FIG. 1.

The server device 10 here is comprised of a CPU (Central Processing Unit), a storage device and an input/output interface, for example. The storage device includes a ROM (Read Only Memory) and an HDD for storing programs and data which are processed by the CPU, and a RAM (Random Access Memory) which is primarily used for various work areas to control processing. These components are interconnected via a bus. Each function of the server device 10, which is described later, can be implemented by the CPU executing programs stored in ROM, processing messages received via the input/output interface and data developed in RAM.

Figure 2:
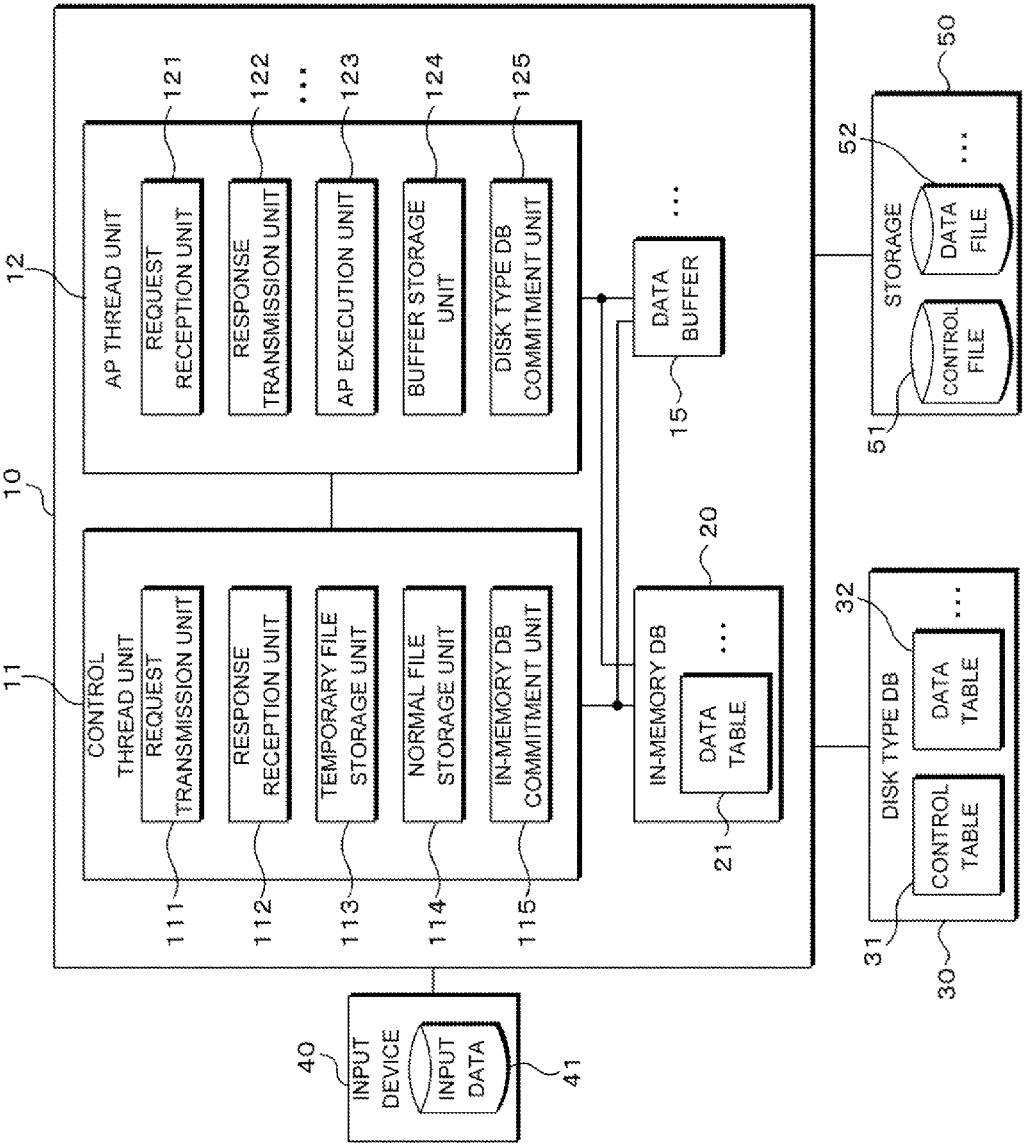
FIG. 2 is a block diagram depicting an example of a functional configuration of a server device according to a first embodiment.

As FIG. 2 shows, in terms of function, the server device 10 has a control thread unit 11 and an AP (Application Program) thread unit 12, for example.

The control thread unit 11 has a request transmission unit 111, a response reception unit 112, a temporary file storage unit 113, a normal file storage unit 114, and an in-memory DB commitment unit 115.

The request transmission unit 111 transmits a processing start request to start operational processing to all the AP thread units 12. The request transmission unit 111 transmits a commitment request to commit the disk type DB 30 to all the AP thread units 12. The response reception unit 112 receives the commitment completion notice (described later) transmitted from the AP thread unit 12.

The temporary file storage unit 113 stores the output data, which was stored in the data buffer 15 by the buffer storage unit 124 of the later mentioned AP thread unit 12, in a data file (hereafter "temporary file") 52, which is located in a directory which cannot be referred to from another process.

The temporary file storage unit 113 updates (e.g. increments) the processing progress state of the control file 51. The data configuration of the control file 51 will now be described with reference to FIG. 3. The control file 51 is a table for managing the progress state of the operational processing in processing units. FIG. 3 shows an example of the data configuration of the control file 51.

As FIG. 3 shows, the control file 51 has a processing progress state item, for example, as a data item. In the processing progress state item, count information, which is incremented each time one operational processing ends in all the AP thread units 12, is stored. One operational processing is started by receiving a processing start request, and ends with transmitting a processing end notice.

Upon receiving commitment completion notices (described later) for all the commitment requests transmitted to the AP thread unit 12, the normal file storage unit 114 changes the directory of the temporary file 52 to a directory which can be referred to from another process. Thereby the output data from the AP thread unit 12 can be stored in the data file (hereafter "normal file") 52 in a directory which can be referred to from another process. A method for storing data in a normal file is not limited to the above mentioned method of changing a directory. For example, a method of creating a temporary file and a normal file in advance and storing data from the temporary file to the normal file may be used.

The in-memory DB commitment unit 115 commits the in-memory DB 20 if the output data from the AP thread unit 12 is stored in a normal file 52.

The AP thread unit 12 has a request reception unit 121, response transmission unit 122, AP execution unit 123, buffer storage unit 124, and disk type DB commitment unit 125.

The request reception unit 121 receives a processing start request and commitment request which are sent from the control thread unit 11.

The AP execution unit 123 executes an application program (hereafter "AP") to perform operational processing while referring to/updating the data table 21 of the in-memory DB 20 and the data table 32 of the disk type DB 30. The data table 21 of the in-memory DB 20 and the data table 32 of the disk type DB 30 may be designed to have the same data items or may be designed to have different data items from each other. In the case of setting different data items, it is preferable to set the data items as follows, for example. Data items of the data used for the operational processing are set in the data table 21 of the in-memory DB 20. Data items of the data required for linking with other systems are set in the data table 32 of the disk type DB 30.

The buffer storage unit 124 stores the output data of the operational processing in the data buffer 15 separately for each AP. The data configuration of the data buffer 15 will now be described with reference to FIG. 4 and FIG. 5. In the data buffer 15, a buffer management table and a buffer table are disposed. The buffer management table is a table for managing the buffer area disposed in the data buffer 15. The buffer table is a table for managing the data stored in the buffer area. FIG. 4 shows an example of the data configuration of the buffer management table. FIG. 5 shows an example of the data configuration of the buffer table.

As FIG. 4 shows, the buffer management table has, as data items, a buffer ID item, buffer size item, update flag item and active flag item, for example. The buffer ID item stores an ID for uniquely specifying a buffer area. The buffer size item stores the size of the buffer area. The update flag item and active flag item store the ON/OFF, for example, as flag information.

As FIG. 5 shows, the buffer table has, as data items, a buffer ID item, block ID item, AP identifier item, effective flag item and data area item. The buffer ID item stores an ID for uniquely specifying the buffer area. The block ID item stores an ID for specifying a sub-block generated by dividing the buffer area into block units. The AP identifier item stores information for uniquely specifying the AP which stored data in a sub-block. The effective flag item stores the ON/OFF, for example, as flag information. The data area item stores the output data of the operational processing corresponding to the AP.

The effective flag item shown in FIG. 5 can be used as follows, for example. In the case when the control thread unit 11 received the processing end notices of all the AP thread units 12, the effective flag of the buffer record storing the output data from each AP thread unit 12 is turned ON. The temporary file storage unit 113 stores the data stored in the data area of the buffer record, of which effective flag is ON, in the temporary file 52. Then the temporary file storage unit 113 can store the output data, which the buffer storage unit 124 of each AP thread unit 12, stored in the data buffer 15, in the temporary file 52. The normal file storage unit 114 turns OFF each effective flag of the buffer record, and then changes the temporary file 52 to the normal file 52, to determine the output data. Thereby the effective flag can be reset before executing the next operational processing.

When a commitment request is received, the disk type DB commitment unit 125 shown in FIG. 2 updates (e.g. increments) the processing progress state stored in the control table 31 of the disk type DB 30 separately for each AP, so as to commit the disk type DB 30. Now the data configuration of the control table 31 will be described with reference to FIG. 6. The control table 31 is a table for managing the progress state of an operational processing in AP units. FIG. 6 shows an example of the data configuration of the control table 31.

As FIG. 6 shows, the control table 31 has, as data items, an AP identifier item and a processing progress state item, for example. The AP identifier item stores information for uniquely specifying an AP which executed an operational processing. The processing progress state item stores count information which is incremented each time one operational processing ends in the AP thread unit 12.

Each processing progress state in the control table 31 shown in FIG. 6 and the processing progress state of the control file 51 shown in FIG. 3 are simultaneously reset when an operational processing is not being executed. Therefore if a failure occurs during the operational processing, the program state of the operational processing can be known for each AP by checking the respective processing progress states.

When an operational processing, executed by the AP execution unit 123, ends, the response transmission unit 122 shown in FIG. 2 issues a processing end notice which indicates the end of the operational processing, and sends it to the control thread unit 11. When the commitment of the disk type DB 30 is completed by the disk type DB commitment unit 125, the response transmission unit 122 issues a commitment completion notice which indicates that the commitment completed, and sends it to the control thread unit 11.

Figure 7:
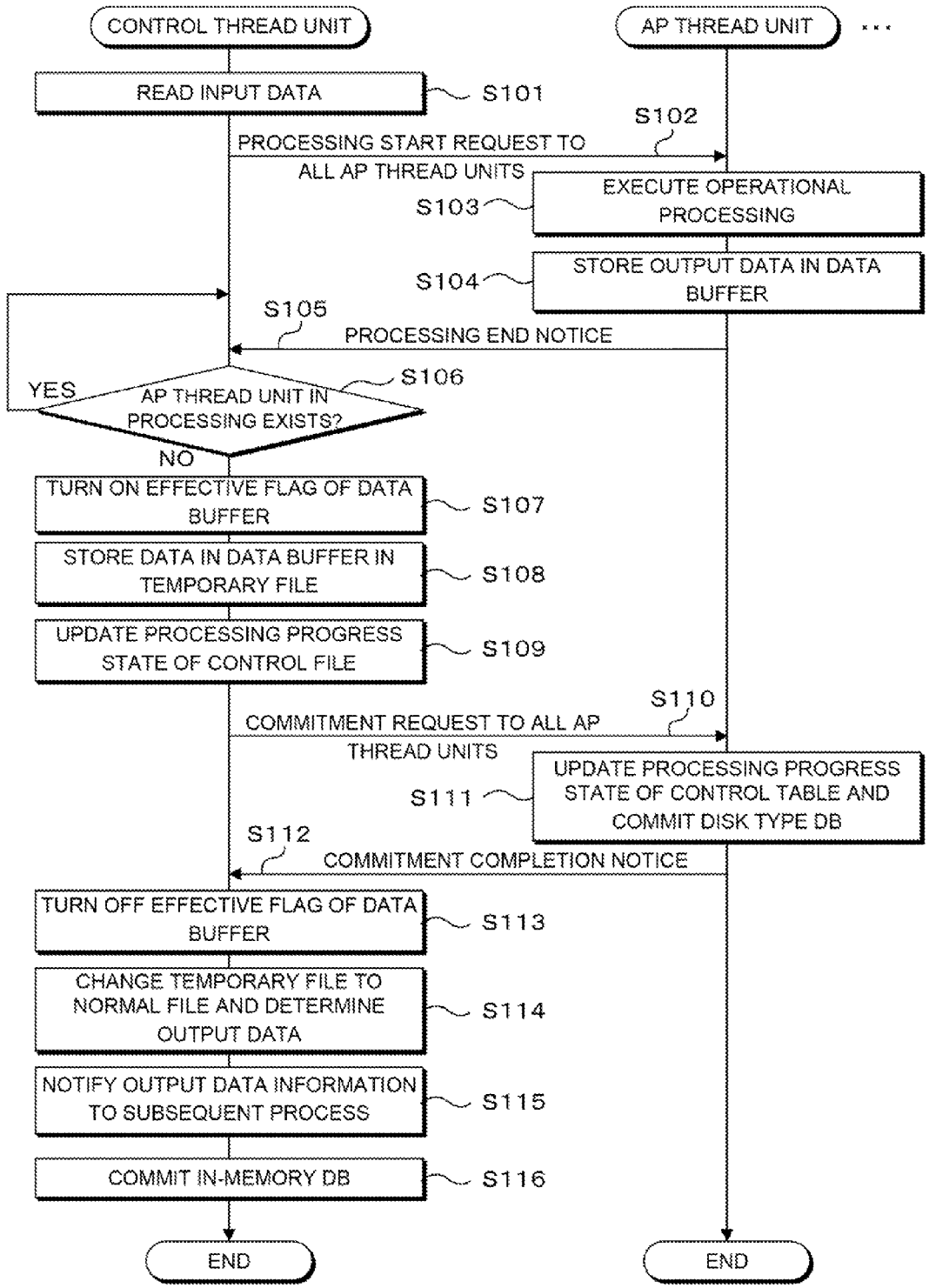
FIG. 7 is a flow chart depicting an example of a processing procedure of the data processing according to the first embodiment.

Now the operation of the data processing system 1 according to the first embodiment will be described with reference to FIG. 7. FIG. 7 is a flow chart depicting the processing procedure of the data processing according to the first embodiment.

First the control thread unit 11 reads the input data 41 from the input device 40 (step S101).

Then the request transmission unit 111 of the control thread unit 11 transmits a processing start request to all the AP thread units 12 to request the start of operational processing (step S102). Thereby the request reception unit 121 of each AP thread unit 12 receives the processing start request transmitted from the control thread unit 11 respectively.

Then the AP execution unit 123 of each AP thread unit 12 executes the operational processing while referring to/updating the data table 21 of the in-memory DB 20 and the data table 32 of the disk type DB 30 (step S103).

Then the buffer storage unit 124 of each AP thread unit 12 stores the output data of the operational processing in the data buffer 15 respectively (step S104).

Then the response transmission unit 122 of the AP thread unit 12, which ended the operational processing, issues a processing end notice to indicate that the operational processing ended, and transmits it to the control thread unit 11 (step S105). Thereby the response reception unit 112 of the control threat unit 11 receives the processing end notice transmitted from each AP thread unit 12.

Then the control thread unit 11 determines whether this is an AP thread unit 12 which is executing the operational processing (step S106), and if the determination result is NO (step S106: NO), the control thread unit 11 turns ON each effective flag of the data buffer 15 (step S107).

Then the temporary file storage unit 113 of the control thread unit 11 stores the output data, stored in the data area of a buffer record of which effective flag is ON, out of the output data stored in the data buffer 15 in step S104, in the temporary file 52 (step S108).

Then the temporary file storage unit 113 of the control thread unit 11 updates the processing progress state of the control file 51 (step S109).

Then the request transmission unit 111 of the control thread unit 11 transmits a commitment request to all the AP thread units 12 to request to commit the disk type DB 30 (step S110). Thereby the request reception unit 121 of each AP thread unit 12 receives the commitment request transmitted from the control thread unit 11 respectively.

Then the disk type DB commitment unit 125 of each AP thread unit 12 updates the processing progress state stored in the control table 31 of the disk type DB 30, and commits the disk type DB 30 (step S111).

Then the response transmission unit 122 of each AP thread unit 12 issues a commitment completion notice to indicate that the commitment completed, and transmits it to the control thread unit 11 (step S112). Thereby the response reception unit 112 of the control thread unit 11 receives the commitment completion notice transmitted from each AP thread unit 12.

Then the normal file storage unit 114 of the control thread unit 11 turns OFF each effective flag of the data buffer 15 (step S113).

Then the normal file storage unit 114 of the control thread unit 11 changes the directory of the temporary file 52 to a directory which can be referred to from another process, whereby the temporary file 52 is changed to the normal file 52 to determine the output data (step S114).

Then the control thread unit 11 notifies the output data information to the subsequent process (step S115). The output data information includes the directory information of the normal file 52, for example.

Then the in-memory DB commitment unit 115 of the control thread unit 11 commits the in-memory DB 20 (step S116). Thereby the output data of the operational processing to be executed in one process is determined.

As mentioned above, according to the data processing system 1 of the first embodiment, processing using the in-memory DB 20 is possible when each AP thread unit 12 executes operational processing, so the operational processing becomes faster. Processing using the disk type DB 30 is also possible when each AP thread unit 12 executes operational processing, so links with another system can be implemented easily.

According to the data processing system 1 of the first embodiment, the processing progress state is managed for each AP thread unit 12, so that the control table 31 for storing this processing progress state and the data table 32 of the disk type DB 30 for storing the operational processing data can be simultaneously committed, and a normal file 52, which is transferred to another processing when this commitment is completed, is defined so that the data table 21 of the in-memory DB 20, for storing the operational processing data, can be committed. As a result, the consistency of the data of the disk type DB 30, data in the normal file 52, and data in the in-memory DB 20 included in one process, can be known with certainty in each operational processing. Thereby recovery when a failure occurs can be performed easily.

Second Embodiment

A second embodiment of the present invention will now be described. A difference of the data processing system according to the second embodiment, from the above mentioned data processing system according to the first embodiment, is having a function to handle a state when a deadlock is generated between a part of AP thread units 12, which execute operational processing, and the processing end notice is not transmitted from the AP thread units 12.

Figure 8:
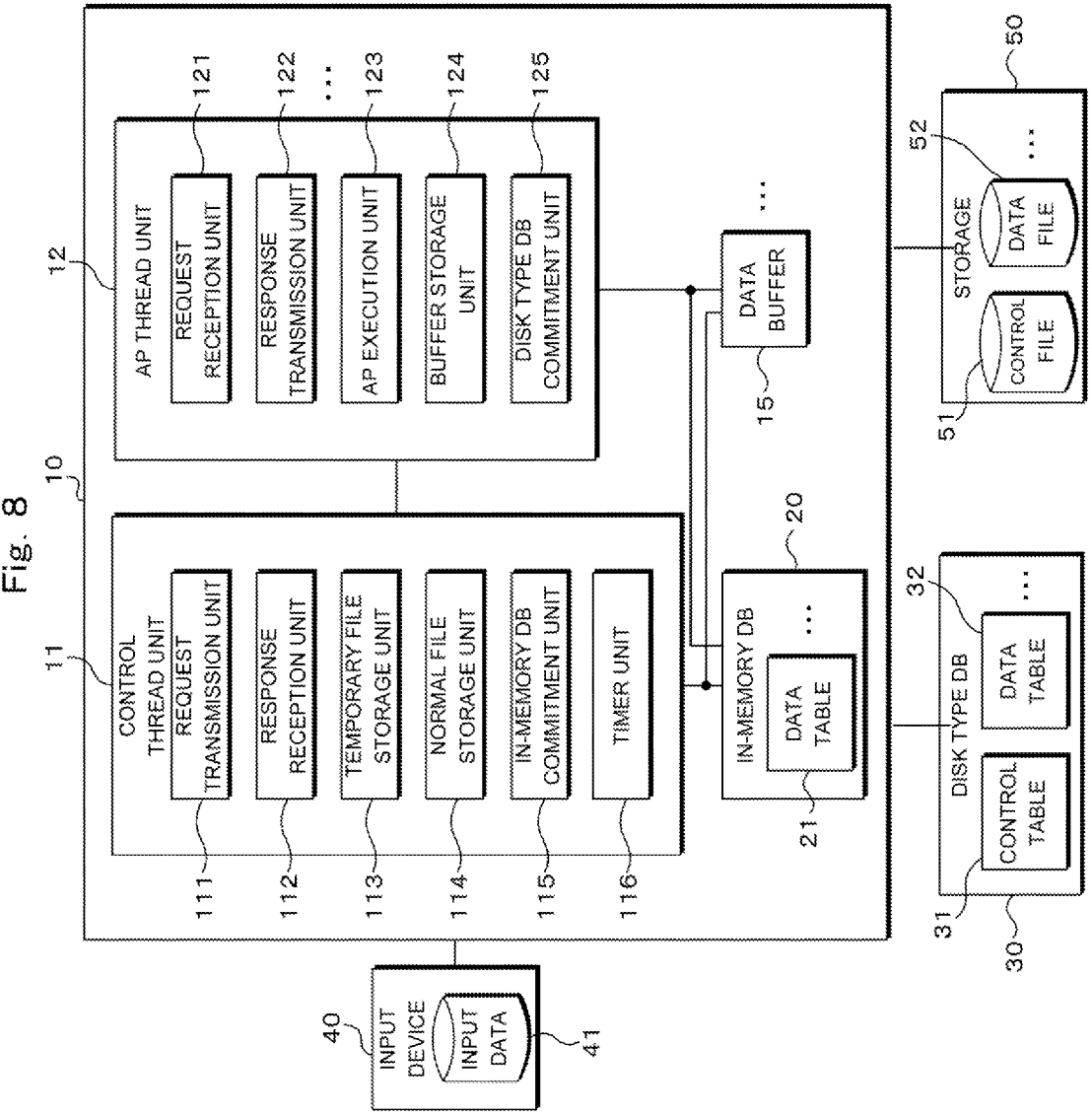
FIG. 8 is a block diagram depicting an example of a functional configuration of a server device according to a second embodiment.

FIG. 8 shows an example of the functional configuration of a server device 10, of the data processing system according to the second embodiment. A difference of the server device 10 according to the second embodiment, from the functional configuration of the server device 10 according to the first embodiment, is that the control thread unit 11 has a timer unit 116. The rest of the configuration is the same as each configuration of the first embodiment, so the same composing elements are denoted with a same reference symbol, for which description is omitted, and the difference from the first embodiment will be mainly described herein below.

The timer unit 116 of the control thread unit 11 measures the time for waiting for the processing end notice, which is sent from the AP thread unit 12 (hereafter "standby time"). The standby time can be set to an arbitrary value. However according to the present embodiment, the stand by time is set to a value at which the user starts to sense that such a failure as deadlock may have been generated, whereby a part of processing end notices are not transmitted or are delayed considerably.

The request transmission unit 111 of the control thread unit 11 according to the second embodiment transmits a commitment request only to the AP thread unit 12 which issued the processing end notice during a standby time.

The disk type DB commitment unit 125 of the AP thread unit 12 according to the second embodiment updates only the processing progress state corresponding to the AP thread unit 12 which issued the processing end notice during the standby time, out of the processing progress states stored in the control table 31 of the disk type DB 30.

Figure 9:
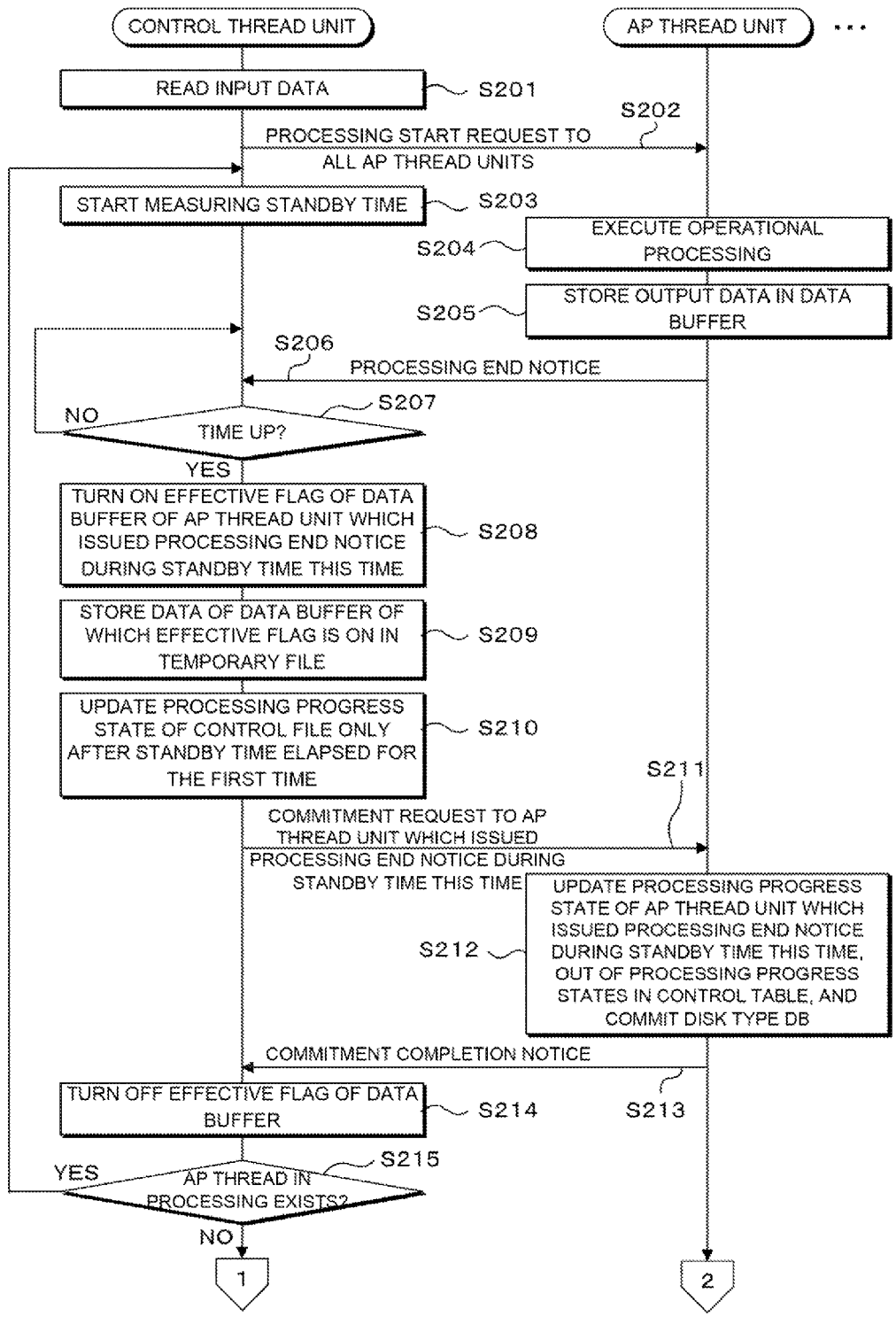
FIG. 9 is a flow chart depicting an example of a processing procedure of the data processing according to the second embodiment (Part 1)
Figure 10:
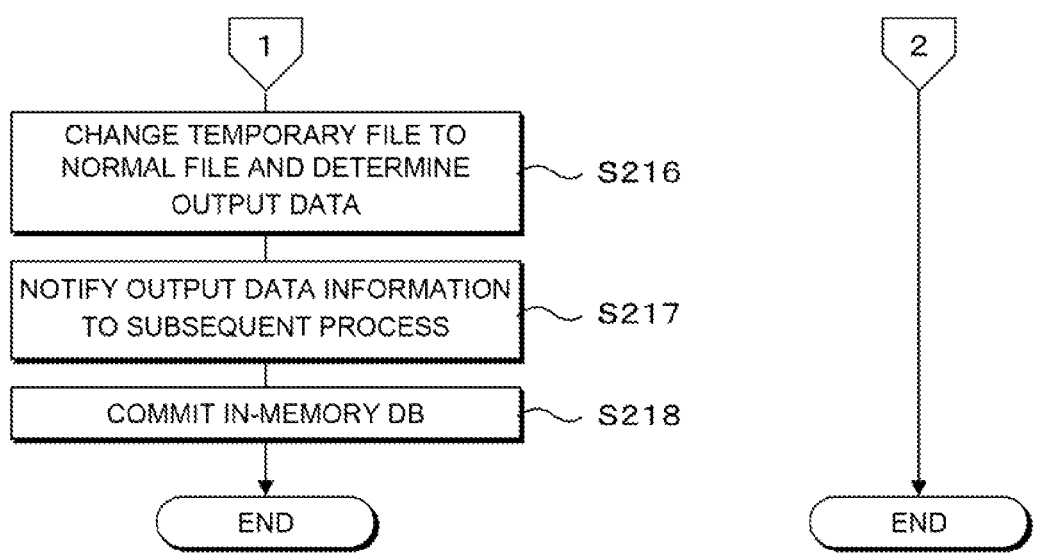
FIG. 10 is a flow chart depicting an example of a processing procedure of the data processing according to the second embodiment (Part 2).

Now the operation of the data processing system 1 according to the second embodiment will be described with reference to FIG. 9 and FIG. 10. FIG. 9 and FIG. 10 are flow charts depicting the processing procedure of the data processing according to the second embodiment.

First the control thread unit 11 reads the input data 41 from the input device 40 (step S201).

Then the request transmission unit 111 of the control thread unit 11 transmits a processing start request to all the AP thread units 12 to request starting an operational processing (step S202). Thereby the request reception unit 121 of each AP thread unit 12 receives the processing start request transmitted from the control thread unit 11 respectively.

Then the timer unit 116 of the control thread unit 11 starts measuring the standby time (step S203).

Then the AP execution unit 123 of each AP thread unit 12 executes the operational processing respectively while referring to/updating the data table 21 of the in-memory DB 20 and the data table 32 of the disk type DB 30 (step S204).

Then the buffer storage unit 124 of each AP thread unit 12 stores the output data of the operational processing in the data buffer 15 respectively (step S205).

Then the response transmission unit 122 of the AP thread unit 12, which ended the operational processing, issues a processing end notice to indicate that the operational processing ended, and transmits it to the control thread unit 11 (step S206). Thereby the response reception unit 112 of the control thread 11 receives the processing end notices transmitted from one or more AP thread units 12.

Then the timer unit 116 of the control thread unit 11 determines whether the standby time is up (step S207), and if the determination result is YES (step 207: YES), each effective flag of the data buffer 15 corresponding to the AP thread unit 12, which issued the processing end notice during this standby time, is turned ON (step S208). If the processing end notice is received from all the AP thread units 12 before the standby time is up in the above determination in step S207, processing may move to step S208, cancelling the measurement of the standby time.

Then the temporary file storage unit 113 of the control thread unit 11 stores the output data stored in the data area of a buffer record, of which effective flag is ON, out of the output data stored in the data buffer 15 in step S205, in the temporary file 52 (step S209).

Then the temporary file storage unit 113 of the control thread unit 11 updates the processing program state of the control file 51 only after the standby time has elapsed the first time (step S210).

Then the request transmission unit 111 of the control thread unit 11 transmits a commitment request to all the AP thread units 12, which issued the processing end notice during this standby time, to request to commit the disk type DB 30 (step S211). Thereby each request reception unit 121 of one or more AP thread units 12 receive(s) the commitment request transmitted from the control thread unit 11 respectively.

Then the disk type DB commitment unit 125 of each AP thread unit 12 updates the processing progress state corresponding to the AP thread unit 12, which issued the processing end notice during this standby time, out of the processing progress states stored in the control table 31 of the disk type DB 30, and commits the disk type DB 30 (step S212).

Then the response transmission unit 122 of each AP thread unit 12 issues a commitment completion notice to indicate that the commitment completed, and transmits it to the control thread unit 11 (step S213). Thereby the response reception unit 112 of the control thread unit 11 receives each commitment completion notice transmitted from one or more AP thread units 12.

Then the normal file storage unit 114 of the control thread unit 11 turns OFF each effective flag of the data buffer 15 (step S214).

Then the control thread unit 11 determines whether an AP thread unit 12 executing the operational processing exists (step S215), and if this determination result is YES (step S215: YES), processing moves to the above mentioned step S203.

If it is determined that no AP thread unit 12 executing the operational processing exists as a result of determination in step S215 (step S215: NO), then the normal file storage unit 114 of the control thread unit 11 changes the directory of the temporary file 52 to a directory which can be referred to from another process, whereby the temporary file 52 is changed to the normal file 52, and the output data is determined (step S216).

If it can be determined that an AP thread unit 12 freezes up due to deadlock, for example, the operational processing of this AP thread unit 12 can be set to the stop state. In this case, the determination result of the step S215 becomes NO, so the processing can be moved to step S216 or later. Thereby even if a part of the AP thread units 12 enter the stop state, only data for which normal operation processing is completed can be provided to subsequent processes.

Then the control thread unit 11 notifies the output data information to the subsequent process (step S217).

Then the in-memory DB commitment unit 115 of the control thread unit 11 commits the in-memory DB 20 (step S218). Thereby the output data of the operational processing to be executed in one process is determined.

As mentioned above, data processing system 1 according to the second embodiment has the following effect, in addition to the effect of the data processing system 1 according to the first embodiment described above. Even if such a failure as deadlock is generated and a part of the AP thread units 12 enter stop state, the data which is output from the AP thread units 12, which normally ended the operational processing, can be stored in the normal file 52. Therefore when a failure occurs, part of the normal data can still be provided to the subsequent process before performing recovery.

[Variant Form]

The above mentioned embodiments are merely examples, and the invention should not exclude various modifications and ways of application of a technology not explicitly mentioned in each embodiment. In other words, numerous modifications can be made without departing from the spirit and scope of the invention.

For example, the server device 10, according to each embodiment described above, may further have a state management table for managing the state of each AP thread unit 12, and a recovery unit which performs recovery according to the content of the state management table. The state management table manages the state of each AP thread unit 12 according to various states, such as processing standby, processing in-execution, processing normal end, processing abnormal end, during commitment, commitment success, commitment failure, during rollback, rollback failure and rollback success. The recovery unit executes recovery processing, including rollback and commitment, according to the state of each AP thread unit. Examples of the recovery processing are: rollback which is performed when it can be determined that a failure occurred in the middle of operational processing; and commitment which is performed when it can be determined that a failure occurred after operational processing ends. For the recovery processing by the recovery unit, methods similar to the various conventional recovery processing can be used.

An exemplary advantage according to the present invention, a system which executes processes in steps is provided, so as to increase the speed of processing and implement links with other systems easily.

The whole or part of the exemplary embodiments disclosed above can be described as, but not limited to, the following supplementary notes.

(Supplementary Note 1)

A data processing system including: an execution unit which executes a plurality of applications in one process while referring to/updating a first database for storing data in a main storage device and a second database for storing data in an auxiliary storage device; a buffer storage unit which stores output data by the application executed by the execution unit in a buffer separately for each of the applications; an issuing unit which issues a processing end notice every time processing by the application ends; a first storage unit which stores, out of the output data stored in the buffer, the output data corresponding to the application for which the processing end notice is issued, in a first file which cannot be referred to from another process; a commitment request unit which requests the application for which the processing end notice is issued to commit the second database; a first commitment unit which updates a processing progress state stored in the second database separately for each of the applications, and commits the second database when commitment is requested; a second storage unit which stores the output data stored in the first file, in a second file which can be referred to from another process, when the commitment by the first commitment unit is completed for all the applications; and a second commitment unit which commits the first database when the output data in the first file is stored in the second file.

(Supplementary Note 2)

A data processing system according to Supplementary note 1, further including a timer unit which measures time from when a processing start request for the application is assigned to the application until when a predetermined time point is reached, wherein the first storage unit stores, out of the output data stored in the buffer, the output data corresponding to the application for which the processing end notice is issued while the measurement is being performed by the timer unit, in the first file.

(Supplementary Note 3)

A data processing system according to Supplementary note 2, wherein the timer unit performs the measurement for the predetermined time point again when the application which is being processed exists after the commitment is completed for all the applications for which the commitment is requested, and the first storage unit stores, out of the output data stored in the buffer, the output data corresponding to the application for which the processing end notice is issued while the measurement is being performed again by the timer unit, in the first file.

(Supplementary Note 4)

A data processing method, including: an execution step of executing a plurality of applications in one process while referring to/updating a first database for storing data in a main storage device and a second database for storing data in an auxiliary storage device; a buffer storage step of storing output data by the application executed in the execution step in a buffer separately for each of the applications; an issuing step of issuing a processing end notice every time processing by the application ends; a first storage step of storing, out of the output data stored in the buffer, the output data corresponding to the application for which the processing end notice is issued, in a first file which cannot be referred to from another process; a commitment request step of requesting the application for which the processing end notice is issued to commit the second database; a first commitment step of updating a processing progress state stored in the second database separately for each of the applications, and committing the second database when the commitment is requested; a second storage step of storing the output data stored in the first file in a second file which can be referred to from another process, when the commitment in the first commitment step is completed for all the applications; and a second commitment step of committing the first database when the output data in the first file is stored in the second file.

(Supplementary Note 5)

A data processing program for causing a computer to execute each step according to Supplementary note 4.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A data processing system, comprising:
an execution unit programmed to execute a plurality of applications in one process while referring to/updating a first database for storing data in a main storage device and a second database for storing data in an auxiliary storage device;
a buffer storage unit programmed to store output data by each of the applications executed by the execution unit in a buffer separately for each of the applications;
an issuing unit programmed to issue a processing end notice every time processing by each of the application ends;
a first storage unit programmed to store, out of the output data stored in the buffer, the output data corresponding to each of the applications for which the processing end notice is issued, in a first file which cannot be referred to from another process;
a commitment request unit programmed to request each of the applications for which the processing end notice is issued to commit the second database;
a first commitment unit programmed to update a processing progress state stored in the second database separately for each of the applications, and commits the second database when commitment is requested;
a second storage unit programmed to store the output data stored in the first file, in a second file which can be referred to from another process, when the commitment by the first commitment unit is completed for all the applications;
a second commitment unit programmed to commit the first database when the output data in the first file is stored in the second file; and
a timer unit programmed to measure time from when a processing start request for the application is assigned to the each of the applications until when a predetermined time point is reached;
wherein:
the first storage unit programmed to store, out of the output data stored in the buffer, the output data corresponding to the each of the applications for which the processing end notice is issued while the measurement is being performed by the timer unit, in the first file;
the timer unit programmed to perform the measurement for the predetermined time point again when the application which is being processed exists after the commitment is completed for all the applications for which the commitment is requested; and
the first storage unit programmed to store, out of the output data stored in the buffer, the output data corresponding to the application for which the processing end notice is issued while the measurement is being performed again by the timer unit, in the first file.

2. A data processing method, comprising:
an execution step of executing a plurality of applications in one process while referring to/updating a first database for storing data in a main storage device and a second database for storing data in an auxiliary storage device;
a buffer storage step of storing output data by each of the applications executed in the execution step in a buffer separately for each of the applications;
an issuing step of issuing a processing end notice every time processing by each of the application ends;
a first storage step of storing, out of the output data stored in the buffer, the output data corresponding to each of the applications for which the processing end notice is issued, in a first file which cannot be referred to from another process;
a commitment request step of requesting each of the applications for which the processing end notice is issued to commit the second database;
a first commitment step of updating a processing progress state stored in the second database separately for each of the applications, and committing the second database when the commitment is requested;
a second storage step of storing the output data stored in the first file in a second file which can be referred to from another process, when the commitment in the first commitment step is completed for all the applications;
a second commitment step of committing the first database when the output data in the first file is stored in the second file;
measuring time from when a processing start request for the application is assigned to the each of the applications until when a predetermined time point is reached;
storing, out of the output data stored in the buffer, the output data corresponding to the each of the applications for which the processing end notice is issued while the measurement is being performed by the timer unit, in the first file;
performing the measurement for the predetermined time point again when the application which is being processed exists after the commitment is completed for all the applications for which the commitment is requested; and
storing, out of the output data stored in the buffer, the output data corresponding to the application for which the processing end notice is issued while the measurement is being performed again by the timer unit, in the first file.

* * * * *